United States Patent [19]

Newswanger

[11] Patent Number: 4,799,739
[45] Date of Patent: Jan. 24, 1989

[54] REAL TIME AUTOSTEREOSCOPIC DISPLAYS USING HOLOGRAPHIC DIFFUSERS

[75] Inventor: Craig Newswanger, Sylmar, Calif.

[73] Assignee: Advanced Dimensional Displays, Inc., Van Nuys, Calif.

[21] Appl. No.: 84,326

[22] Filed: Aug. 10, 1987

[51] Int. Cl.⁴ .......................... G02B 5/32; G02B 27/22
[52] U.S. Cl. ........................................ 350/3.7; 350/131
[58] Field of Search .......................... 350/3.7, 131, 3.6

[56] References Cited

U.S. PATENT DOCUMENTS 4,500,163  2/1985  Burns et al. .......................... 350/3.7

OTHER PUBLICATIONS

Astuatsaturov et al., "Microprojection System Having a Holographic Screen", *Sov. J. Opt. Technol.*, 50 (10), Oct. 1983, pp. 631–633.

*Primary Examiner*—Bruce Y. Arnold
*Attorney, Agent, or Firm*—Blakely, Sokoloff, Taylor & Zafman

[57] ABSTRACT

Methods and apparatus for providing real time autostereoscopic displays using holographic diffusers are disclosed. In accordance with the method, a diffuse holographic optical element is fabricated whereby an image projected onto the diffused holographic optical element will be viewable only over a limited horizontal extent of less than the separation of a typical viewer's eyes. Then the holographic optical element is used as a projection screen for a plurality of projectors spatially positioned with respect to each other so that the horizontal position within which the image of each projector is viewable is substantially contiguous with the horizontal position of viewability of the respective adjacent projector whereby the autostereoscopic effect is achieved. Various embodiments, including the transmission mode and reflection mode holographic optical elements, are disclosed.

17 Claims, 2 Drawing Sheets

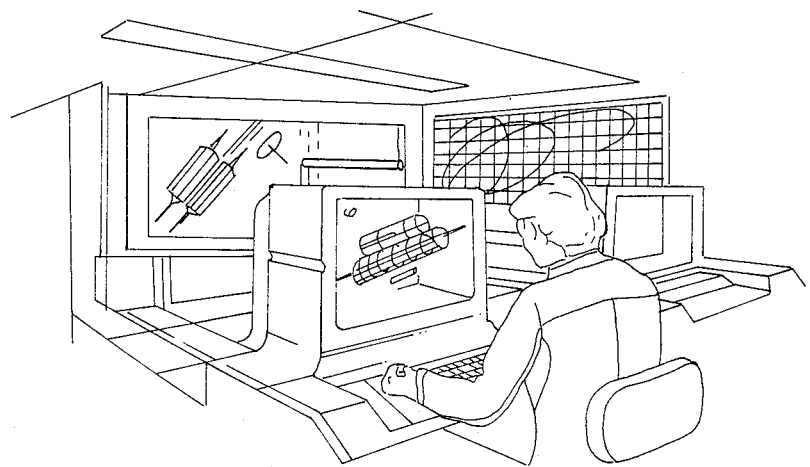
Fig. 3
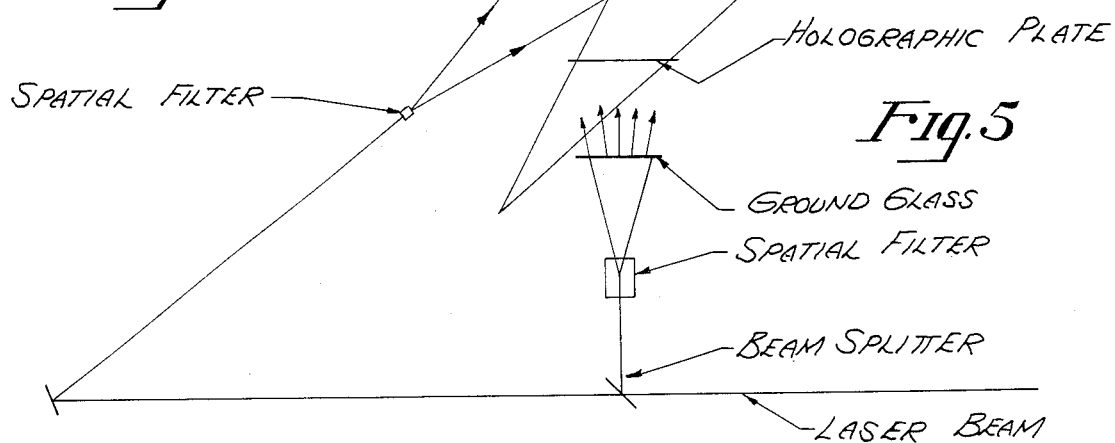
Fig. 4
Fig. 5

REAL TIME AUTOSTEREOSCOPIC DISPLAYS USING HOLOGRAPHIC DIFFUSERS

BACKGROUND OF THE INVENTION

1. Field of the Invention

This invention relates to the field of three-dimensional displays.

1. Prior Art

Traditional refractive optics has produced two screen-like mechanisms for three-dimensional viewing without headgear. The first screen mechanism is the Fresnel screen. This technique utilizes twin images projected onto a Fresnel lens, as if it were a projection screen. In a typical situation, the view is as far in front of the lens as the projectors are behind it. If the projectors are spaced the same as the viewer's eyes, then the viewer can be positioned so that each eye receives the appropriate image, and stereo vision results. Unfortunately, this process is limited by size of the system's exit pupil, and only one viewer is possible, since his head will fill the exit pupil. Also, to avoid loss of viewing, the viewer's movement must be restricted.

The second screen mechanism uses lenticular plates in the form of sheets consisting of hundreds or thousands of narrow cylinder lenses arrayed in parallel, and produces some important improvements. In essence, the Fresnel screen of the first system is replaced by a sandwich of diffusing medium between two lenticular plates. The lenticules face outward and run vertically. Lenticules on the two plates are carefully aligned to be parallel to and in line with each other. Again, the twin images are projected onto the screen. In this case however, each lenticule on the first sheet images the strip of image falling on it onto the diffusing material. The lenticules of the second sheet then allow viewing of each total image only from particular angles. Because of the diffusion material and arrangement of lenticules, the vertical axis of the exit pupil is extended. Also, as lenticules in the second sheet image strips not only in line, but perhaps one or two strips adjacent, multiple exit pupils are created, allowing multiple viewers. An additional advantage of the lenticular screen is that a multiplicity of images projected onto the screen will be presented to the viewer as a continuous, autostereoscopic field. This permits the viewer to move within the field and to perceive motion parallax. A disadvantage to this technique, however, is the difficulty of manufacturing large lenticular sheets and performing the careful alignment needed to assemble the screen.

The present invention preserves the advantages of a continuous autostereoscopic field for motion parallax and multiple viewer capabilities, but does so in a much more easily and inexpensively manufactured system.

BRIEF SUMMARY OF THE INVENTION

Methods and apparatus for providing real time autostereoscopic displays using holographic diffusers are disclosed. In accordance with the method, a diffuse holographic optical element is fabricated whereby an image projected onto the diffused holographic optical element will be viewable only over a limited horizontal extent of less than the separation of a typical viewer's eyes. Then the holographic optical element is used as a projection screen for a plurality of projectors spatially positioned with respect to each other so that the horizontal position within which the image of each projector is viewable is substantially contiguous with the horizontal position of viewability of the respective adjacent projector whereby the autostereoscopic effect is achieved. Various embodiments, including transmission mode and reflection mode holographic optical elements, are disclosed.

BRIEF DESCRIPTION OF THE DRAWINGS

FIG. 3 is an artist's conception of an application of the present invention to a CAD/CAM application.

FIG. 4 is schematic illustration of an autostereoscopic display in accordance with the present invention using a reflection mode diffuse holographic optical element.

FIG. 5 is a schematic diagram of a typical setup used to expose the holographic plate in the process of making the diffuse holographic optical element used in the embodiment of FIG. 4.

DETAILED DESCRIPTION OF THE INVENTION

Figure 1:
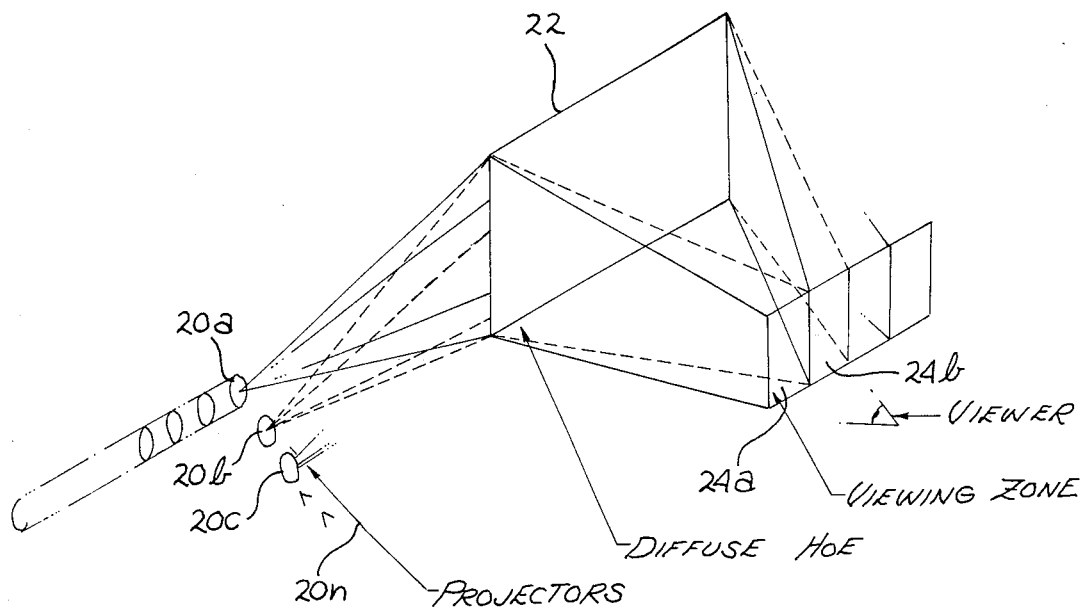
FIG. 1 is a schematic diagram of an autostereoscopic display in accordance with the present invention.

First referring to FIG. 1, a schematic diagram of an autostereoscopic display in accordance with the present invention may be seen. As shown, a linear array of projectors 20(a) through 20(n) superimpose individual images onto a diffuse holographic optical element 22. The particulars of each image, especially the viewpoint perspective, is determined by the angular position of the zone associated with its projector, the projectors in the preferred embodiment using monochromatic light sources. Because of the characteristics of the holographic optical element 22, each image is only visible from viewpoints in the associated viewing zone. By way of example, the image projected onto the back of the holographic optical element 22, a transmission holographic optical element, is viewable only in viewing zone 24(a), though within that zone one may focus on any part of that image, depending upon where on the holographic optical element 22 one is looking. In general, the viewing zones, such as zone 24(a) will have a substantial vertical extent so that the exact elevation of the viewer's eyes will not be critical. The horizontal extent however, will normally be some fraction of the separation of a typical viewer's eyes so that only one eye may view the image viewable through viewing zone 24(a) at any one time.

The image of camera 20(b) is also projected onto the holographic optical element 22 to overlay the image of camera 20(a). Because of the different angle from which the image is projected to the holographic optical element 22, the viewing zone 24(b) for the image of projector 20(b) will be horizontally displaced from the viewing zone 24(a) of the image of projector 20(a). Preferably the various viewing zones are contiguous so that each eye of the viewer may always see one, but only one, image for any one position of the eye. Thus when a person is positioned such that each eye is in a separate viewing zone, as will normally be the case, parallax is seen and a single three dimensional image is perceived. Horizontal motion parallax is of course also achieved within the range of the totality of the viewing zones, with multiple viewers being limited only by the actual size of the combined viewing zones.

In the lower limit, the number of projectors may be two, with the width of the viewing zones 24(a) and 24(b) each being on the order of 0.5 feet. So long as the viewer positions himself so that the junction between the two viewing zones 24(a) and 24(b) was located between the eyes of the viewer, a stereoscopic display would be achieved, and of course if movie projectors were used, a real time autostereoscopic display would be achieved. Ideally however, a relatively large number of relatively narrow viewing zones and thus a relatively large number of projectors should be used so that the difference between the images of adjacent projectors and thus adjacent viewing zones are slight, and no step change is perceived as the viewer moves his head in a horizontal direction within the combined viewing zone. Also, to the extent that viewing zones are relatively narrow, and thus adjacent images are quite similar, the viewing zones may in fact overlap, though in the region of overlap, the intensity of the perceived image may be greater as two overlayed images will actually be viewed in the overlapping region.

For a stereoscopic display as illustrated in FIG. 3, a total viewing zone on the order of 12 to 18 inches wide might be desired. If each individual viewing zone were on the order of one inch wide, the number of projectors required would be in the range of 12 to 18. Assuming of course that movie projector-type projectors were used, such a large number of synchronized projectors would be relatively expensive. Obviously, however, other types of projectors or projection means which are less expensive and/or have other advantages may also be used. By way of example, rather than to use independent projector and reels of film which are synchronized to each other, a larger film strip capable of containing the images for all projectors could be used, which would enable the use of a single pair of reels, film advance system, etc., and which would automatically synchronize all images. Such a film strip in such a system might run in the approximate direction of the linear projector array, which of course is normally horizontal, though be sufficiently inclined thereto so that the images on the film strip, while appearing one after another for the n projectors, would be angled across the film strip so that successive images in the projector could be effectively nested, thereby advancing the film strip to the next images by only advancing the film strip some small fraction of the length of n successive individual images. Obviously such an arrangement, as noted before, would require only a single film handling and advancing system, and would provide automatic synchronization of the n images. While n sets of lenses would be required, and perhaps multiple light sources would be required for sufficient light intensity, these components would be of relatively low cost.

Obviously other types of imaging systems may also be used. By way of example, to the extent that light from a display such as a cathode ray tube display can be made adequately monochromatic through the use of a proper display, filtering, etc., the linear array of "projectors" might actually be different horizontal strips of a high resolution computer controlled graphics display, imaged in an overlapping manner onto the holographic optical element 22. Such an arrangement would provide computer generated and controlled stereographic displays, allowing the viewer to interact with the stereographic display to rotate the object, alter the object form, etc. Similarly, a television display might be used, or a liquid crystal display might be used as a light mask to form the desired image strips. If the diffuse holographic element was made with the ground glass object tilted at the achromatic angle, the resulting hologram could be illuminated with broadband (white) light. The real image of the diffuser will be dispersed (chromatically smeared) along the achromatic angle. If the ground glass object is longer than the calculated dispersion, then there will be an area equal to the difference between the object and the dispersion where all colors of the spectrum overlap. This would serve to create a holographic diffuser that could be used in a full color display.

The achromatic angle is found by using the diffraction focusing equations to determine the focus points for various colors, then drawing a line through the points to find the angle of dispersion.

Figure 2:
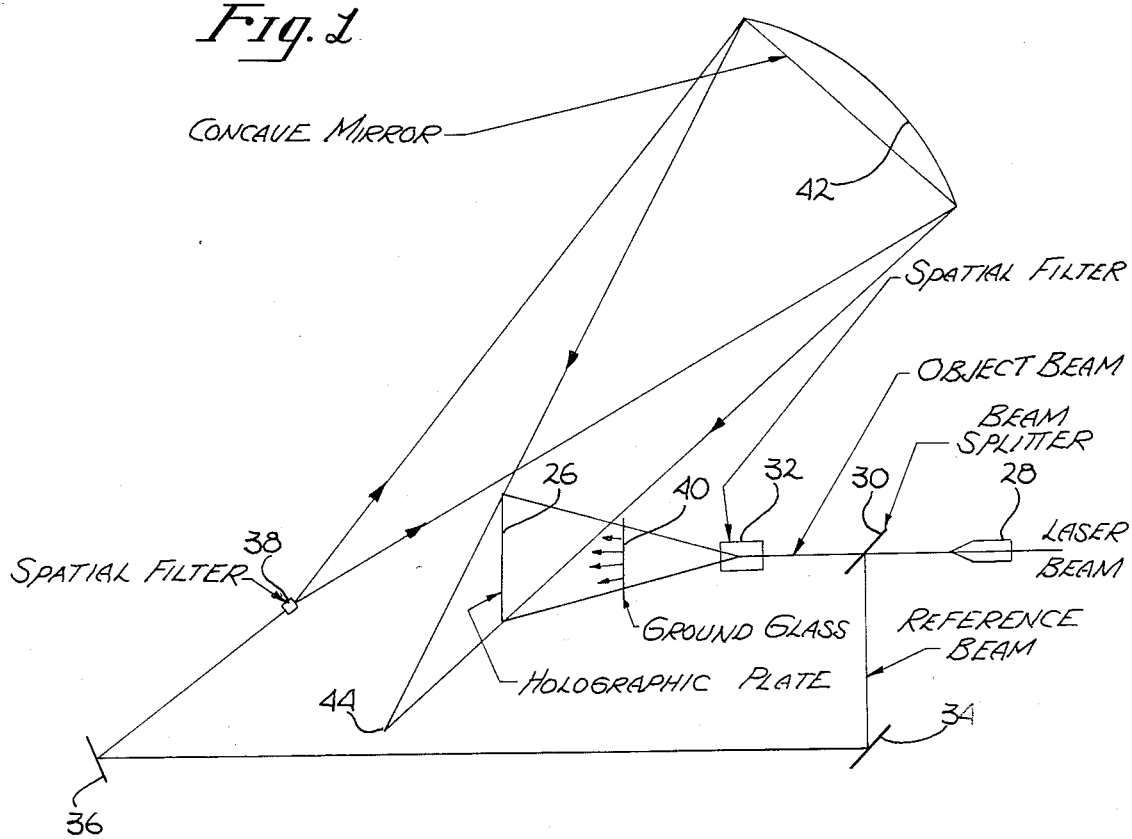
FIG. 2 is a schematic diagram of a top view of a typical setup used to expose the holographic plate in the process of making the diffuse holographic optical element used in the embodiment of FIG. 1.

The creation of the diffuse holographic optical element is closely related to its operation. Referring to FIG. 2, one possible method of creating the diffuse holographic optical element may be seen. This figure shows the setup which could be used to expose holographic plate 26 to form the holographic optical element 22 of FIG. 1. Relating the orientation of the holographic plate 26 to the holographic optical element 22 of FIG. 1, FIG. 2 would represent a top view of the setup. As shown in this figure, a monochromatic light source, generally a laser 28, directs a beam to a beam splitter 30 which allows part of the beam to pass therethrough to a spatial filter 32 and part of the beam to be reflected to reflectors 34 and 36 to a second spatial filter 38. The spatial filter 32 spreads the beam to illuminate a diffuse plate, namely a ground glass plate 40 which in effect illuminates the holographic plate 26 with diffuse the monochromatic light from the ground glass plate 40. At the same time, spatial filter 38 spreads the beam reflected by the beam splitter 30 and mirrors 34 and 36, with the spread beam being reflected by a concave mirror 42 toward a focal point 44 behind the holographic plate 26. Thus the holographic plate 26 is simultaneously illuminated by an object beam providing a diffuse light pattern through ground glass plate 40, and a reference beam having a focal point at point 44. After exposure of the holographic plate 26, the plate of course is developed and may be used or reproduced for use as the holographic optical element 22 of FIG. 1.

Relating the setup of FIG. 2 for exposure of the holographic plate 26 with the display system of FIG. 1, some of the geometric parameters may be readily identified. If the light source for exposing holographic plate 26 is the same wave length as the source for the projector, the focal point 44 of the reference beam is the virtual focal point for the projector associated with the primary or central viewing zone. The optical axis of this beam is the same as the optical axis of the primary projector with respect to the position of the holographic plate. The size (length and width) of the area of the ground glass plate 40 which is illuminated by the object beam determines the size of the individual viewing zone of each projector. Similarly, the distance of the ground glass plate 40 from the holographic plate 26 will be equal to the distance of the viewing zone from the diffuse holographic optical element in FIG. 1. Also, while the ground glass plate has been used in the exemplary setup herein described, other transmissive or reflective diffuse elements may be used such as, by way of example, an opaque matt finished material which of course would be lighted from the front rather than from the back as shown in FIG. 2.

While the system illustrated with respect to FIGS. 1 through 3 utilizes a transmission mode diffuse holographic optical element, a reflection mode system may also be used. By way of example, a schematic illustration of such a system is presented in FIG. 4. As before of course the viewing zone 50 of the display is in front of the diffuse holographic optical element 52, though the projected images are projected to the front thereof rather than from the rear. For convenience, one or more mirrors 54 may be provided so that the projector array 56 may be positioned as desired out of the way of the viewer in any convenient location.

I claim:

1. An autostereoscopic display comprising
   a holographic diffuser means for directing light incident thereto from a point source toward and substantially only toward a viewing zone in a diffuse pattern, and
   means for projecting a plurality of images onto said holographic diffuser means so as to overlie each other on said holographic diffuser means, each image being projected from a somewhat different direction selected so that the viewing zones of said plurality of images are each substantially contiguous to the viewing zones of adjacent images along the adjacent edges thereof.

2. The autostereoscopic display of claim 1 wherein said plurality of images are sequentially different perspective images of the same subject.

3. The autostereoscopic display of claim 2 wherein said means for projecting a plurality of images onto said holographic diffuser means is also a means for frequent updating of said images, whereby a real time autostereoscopic display is obtained.

4. The autostereoscopic display of claim 1 wherein said holographic diffuser means is a transmission mode holographic diffuser.

5. The autostereoscopic display of claim 1 where said holographic diffuser means is a reflection mode holographic diffuser.

6. The autostereoscopic display of claim 1 wherein said means for projecting a plurality of images onto said holographic diffuser means comprises a movie film projection means.

7. The autostereoscopic display of claim 1 wherein said means for projecting a plurality of images onto said holographic diffuser means comprises a cathode ray tube display means.

8. The autostereoscopic display of claim 1 wherein said means for projecting a plurality of images onto said holographic diffuser means comprises a light source means and liquid crystal mask means.

9. The autostereoscopic display of claim 1 wherein the plurality of images is three or more in number.

10. A real time autostereoscopic display comprising
    a holographic diffuser means for directing light incident thereto from a point source toward and substantially only toward a viewing zone in a diffuse pattern, and
    projecting means for projecting a plurality of three or more images of different perspectives of the same scene onto said holographic diffuser means so as to overlie each other on said holographic diffuser means, each image being projected from a respective somewhat different direction selected so that the viewing zones of said plurality of images are each substantially contiguous in side-by-side relation to the viewing zones of adjacent images, said projection means also being a means for repetitively updating each said image, said viewing zones being sufficiently narrow so that a person viewing the same from the position of the viewing zones will see different images with each eye.

11. The real time autostereoscopic display of claim 10 wherein said holographic diffuser means is a transmission mode holographic diffuser.

12. The real time autostereoscopic display of claim 10 where said holographic diffuser means is a reflection mode holographic diffuser.

13. The real time autostereoscopic display of claim 10 wherein said means for projecting a plurality of images onto said holographic diffuser means comprises a movie film projection means.

14. The real time autostereoscopic display of claim 10 wherein said means for projecting a plurality of images onto said holographic diffuser means comprises a cathode ray tube display means.

15. The real time autostereoscopic display of claim 10 wherein said means for projecting a plurality of images onto said holographic diffuser means comprises a light source means and liquid crystal mask means.

16. A method of creating an autostereoscope display comprising the steps of
    (a) forming a holographic diffuser for directing light incident thereto from a point source toward and substantially only toward a viewing zone in a diffuse pattern, and
    (b) projecting more than two images of different perspectives of the same scene onto the holographic diffuser, each from a respective somewhat different direction selected so that the viewing zones of the more than two images are each substantially contiguous in side-by-side relation to the viewing zones of adjacent images and with the viewing zones being sufficiently narrow so that a person viewing the same from the position of the viewing zones will see different images with each eye.

17. The method of claim 16 comprising the additional step of repetitively updating each of the images so as to create a real time autostereoscopic display.

* * * * *